United States Patent [19]

Kazino

[11] Patent Number: 5,335,826
[45] Date of Patent: Aug. 9, 1994

[54] APPARATUS FOR FEEDING NUTS OR THE LIKE

[75] Inventor: Hiroshi Kazino, Komaki, Japan

[73] Assignee: Aoyama Seisakusho Co., Ltd., Aichi, Japan

[21] Appl. No.: 159,046

[22] Filed: Nov. 29, 1993

Related U.S. Application Data

[63] Continuation of Ser. No. 21,358, Feb. 23, 1993, abandoned.

[51] Int. Cl.$^5$ .............................................. B65H 3/30
[52] U.S. Cl. .................................. 221/297; 221/289; 221/210; 221/270; 221/273; 221/276
[58] Field of Search ............... 221/297, 281, 289, 210, 221/213, 214, 215, 216, 251, 262, 268, 269, 270, 272, 273, 276; 269/318, 900, 909

[56] References Cited

U.S. PATENT DOCUMENTS

| | | | |
|---|---|---|---|
| 1,330,639 | 2/1920 | Leumann | 221/251 |
| 2,599,685 | 6/1952 | Berger et al. | 221/251 X |
| 3,077,287 | 2/1963 | White | 221/251 X |
| 3,300,090 | 1/1967 | Carden | 221/281 |
| 3,670,387 | 6/1972 | Nagao | 221/251 |
| 3,780,417 | 12/1973 | Reynolds . | |
| 4,729,713 | 3/1988 | Takaichi et al. . | |
| 4,899,907 | 2/1990 | Benani | 221/297 X |
| 5,000,393 | 3/1991 | Madsen | 221/297 X |

FOREIGN PATENT DOCUMENTS

| | | | |
|---|---|---|---|
| 2611465 | 9/1988 | France | 221/297 X |
| 52-22718 | 6/1977 | Japan . | |
| 52-57486 | 12/1977 | Japan . | |

Primary Examiner—Robert P. Olszewski
Assistant Examiner—Dean A. Reichard
Attorney, Agent, or Firm—Frishauf, Holtz, Goodman & Woodward

[57] ABSTRACT

A nut feeding apparatus which can surely and easily feed nuts and the like, temporarily supported in a conductor cylinder, to an underlying support member one by one, without scratching them by the downward stress or the like of a plunger. A feeder opening 2 through which nuts and the like are continuously fed from a feeding chute, support bar guide holes 3 and ball recesses 4 are provided at a lower side wall of a conductor cylinder 1 in which a plunger 21 having guide grooves 22 formed in the opposite sides of its lower portion is inserted slidably up and down. Balls 5 having a diameter slightly larger than the thickness of the wall of the conductor cylinder 1 and fitted in the respective ball recesses 4. A pair of support bars 11 are inserted slidably in the support bar guide holes 3, and have their outer ends detachably attached to associated leaf springs attached to the outer surface of the conductor cylinder 1.

9 Claims, 3 Drawing Sheets

APPARATUS FOR FEEDING NUTS OR THE LIKE

This application is a continuation of application Ser. No. 08/021,358, filed Feb. 23, 1993, now abandoned.

BACKGROUND OF THE INVENTION

The present invention relates to a feeding apparatus for continuously feeding nuts and the like, such as weld nuts or clinch nuts, onto a workpiece to which the nuts are installed.

A nut feeding apparatus comprising a conductor cylinder having a feeder opening provided at a lower side wall of the cylinder to which nuts and the like are continuously fed from a feeding chute, a plunger fitted in the conductor cylinder slidably up and down having a free end for ejecting nuts and the like fed from the feeder opening, and a temporary support member for temporarily supporting nuts and the like which are fed one by one into the conductor cylinder from the feeder opening is known as disclosed in Examined Japanese Patent Publication No. 52-22718 and 52-57486. However, the conventional nut feeding apparatus is designed to release the temporary support member by the action of nuts and the like ejected by the plunger, giving rise to various problems, such as nuts and the like being scratched by direct contact with the temporary support member or being unable to be held horizontal.

SUMMARY OF THE INVENTION

It is therefore an object of the present invention to provide an inexpensive nut feeding apparatus which does not have the above shortcoming and which can surely and easily feed nuts and the like, temporarily supported in a conductor cylinder, to an underlying workpiece one by one, without scratching them by the downward stress or the like of a plunger.

To achieve this object, a nut feeding apparatus according to the present invention comprises a conductor cylinder having a feeder opening provided at a lower side wall of the cylinder through which nuts and the like are continuously fed from a feeding chute, support bar guide holes for receiving support bars for temporary support of the nuts and the like fed into the conductor cylinder from the feeder opening, ball recesses located above the support bar guide holes, balls having a diameter slightly larger than the thickness of a wall of the conductor cylinder and fitted in the respective ball recesses, leaf springs attached to an outer surface of the conductor cylinder, a pair of support bars inserted slidably in the support bar guide holes for temporary and horizontal supporting of a single nut and the like fed into the conductor cylinder from the feeder opening, each support bar having an outer end detachably attached to an associated one of the leaf springs, and a plunger having guide grooves for the balls formed on opposite sides of a lower portion of the plunger, and inserted slidably up and down in the conductor cylinder, for ejecting nuts and the like.

DETAILED DESCRIPTION OF THE PREFERRED EMBODIMENT

Referring to the accompanying drawings, a nut feeding apparatus according to a preferred embodiment of the present invention, which feeds clinch nuts, will be described in detail below.

A conductor cylinder t is provided at its lower side wall with a feeder opening 2 which is connected to a feeding chute for continuously supplying nuts and the like into the conductor cylinder 1, support bar guide holes 3 for receiving support bars (no be described later) for temporarily supporting the nuts and the like fed from the feeder opening 2, and ball recesses 4 located above the support bar guide holes 3. Balls 5 having a diameter slightly larger than the thickness of the wall of the conductor cylinder 1 are fitted in the respective ball recesses 4.

Figure 3:
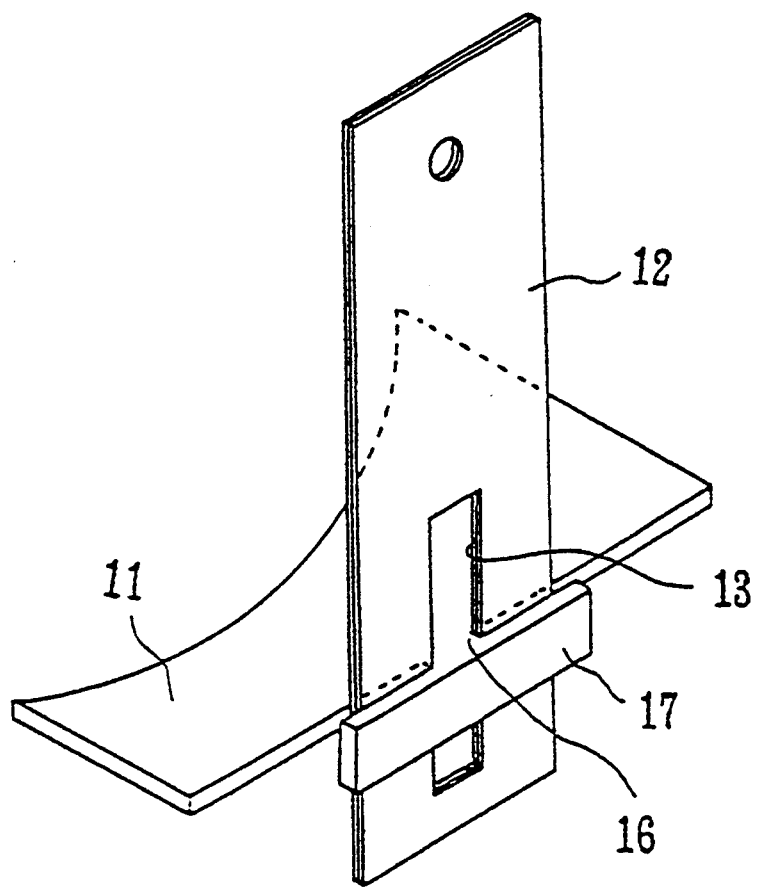
FIG. 3 is a partly cutaway view showing the relationship between leaf springs and support bars.

A pair of support bars 11, which are to be inserted slidably in the support bar guide holes 3, temporarily and horizontally support nuts and the like fed into the conductor cylinder 1 from the feeder opening 2, piece by piece. Each support bar 11 has an arc shape edge to match the shape of the bodies of nuts and the like. Leaf springs 12 are attached to the outer surface of the conductor cylinder 1 so as to close the ball recesses 4 from the outer side. Leaf springs 12 are attached by means of set screws 15 fitted in screw holes 14 formed at the upper portion of the conductor cylinder 1. As shown in FIG. 3, longitudinally elongated engagement holes 13 are provided in the center portions of the leaf springs 12. The attachment/detachment of the leaf springs 12 can be surely and easily conducted by inserting horizontally elongated projected parts 17 provided side by side in association with the engagement holes 13 and then turning the projected parts 17 by 90 degrees for engagement or disengagement. The elastic repulsion of the leaf springs 12 always permits the ends of the support bars 11 to perform a nut holding function in the conductor cylinder 1, and keeps the balls 5 fitted in the ball recesses 4 usually slightly projecting inward from the hole surfaces. The leaf springs 12 in this embodiment are each formed by a lamination of a plurality of thin spring steel plates to provide sufficient durability. Two 0.2-mm thick spring steel plates are laminated one on the other in this embodiment. The nut size is M6.

Figure 1:
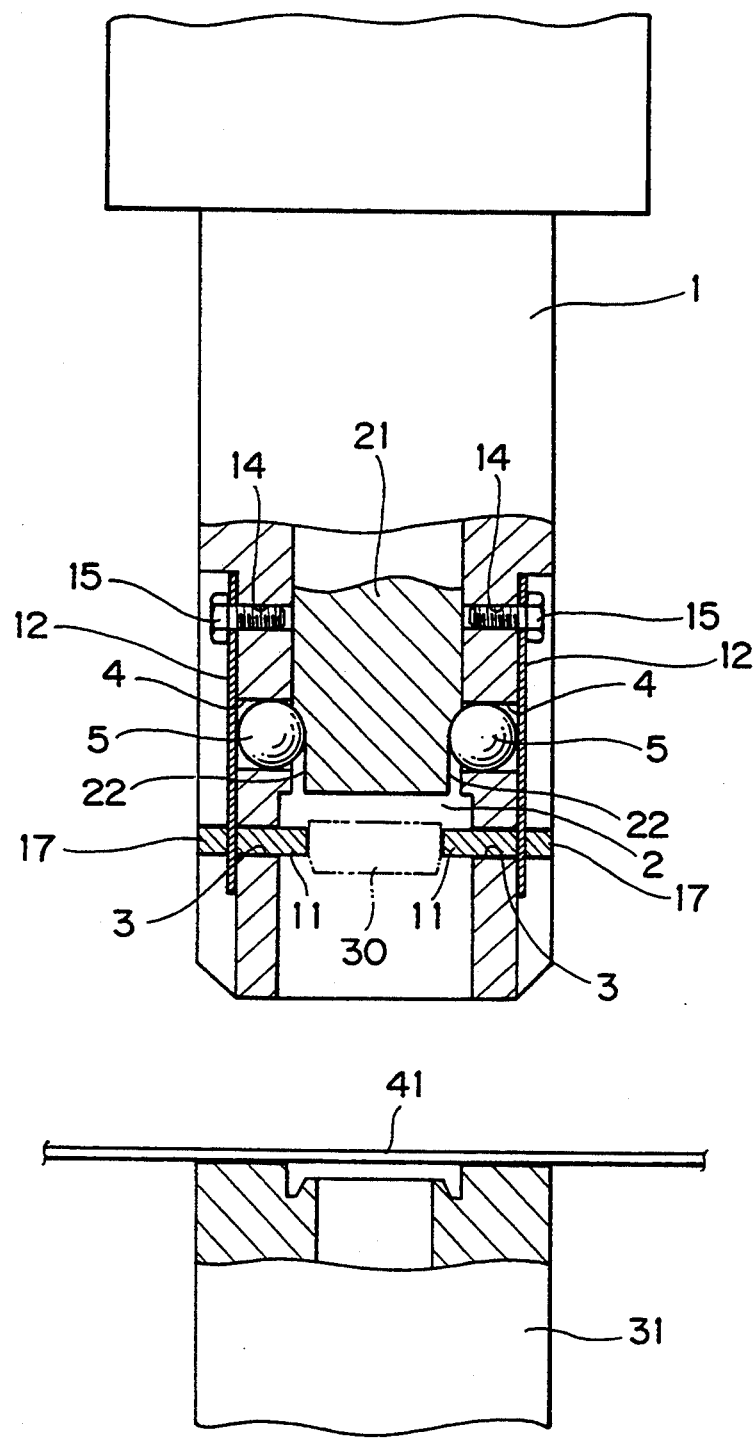
FIG. 1 is a partly cutaway front view of one embodiment of the present invention, illustrating nuts and the like being temporarily supported.
Figure 2:
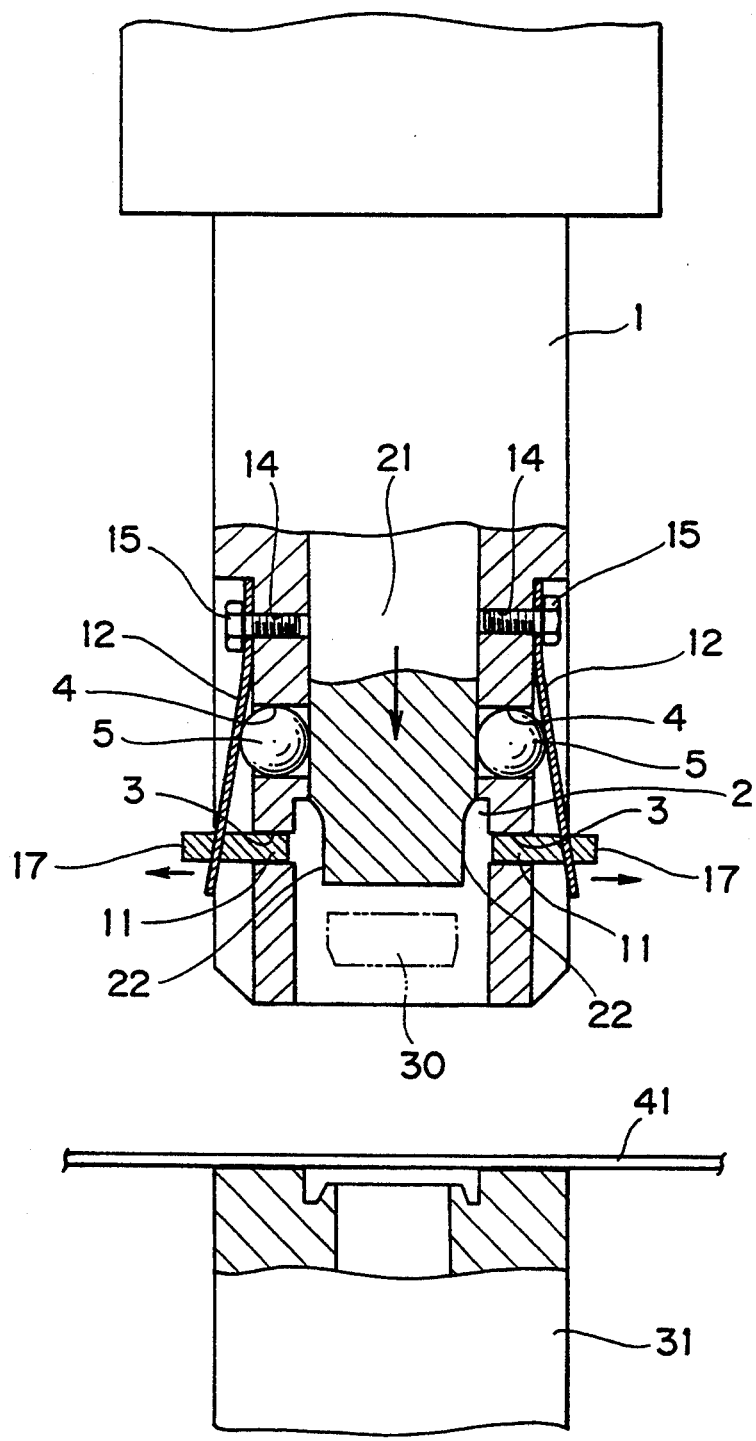
FIG. 2 illustrates a nut feeding apparatus in FIG. 1, with the temporary support of nuns and the like being released.

A plunger 21 is fitted slidably up and down in the conductor cylinder 1 to eject nut and the like 30 temporarily supported horizontally inside the feeder opening 2 by the support bars 11. The lower end of the plunger 21 is usually located above the upper end of the feeder opening 2. Guide grooves 22 for guiding the balls 5 are formed in the opposite sides of the lower portion of the plunger 21 through the lower end. As shown in FIG. 2, when this plunger 21 slides down and both guide grooves 22 abut on the respective balls 5, pushing the balls outward, the support bars 11 whose ends lie in the conductor cylinder 1 to perform the nut holding function due to the force of the leaf springs 12 retrace along the support bar guide holes 3, impairing the nut holding function. The nut and the like 30 is therefore pushed downward. When the plunger 21 rises, the retracted support bars 11 protrude together with the balls 5 again into the conductor cylinder 1 by the elastic repulsion of the leaf springs 12, regaining the nut holding function. In FIG. 1, reference numeral 31 denotes a support member for a workpiece, which is provided under the conductor cylinder 1; this support member 31 serves as a lower electrode when the plunger 21 serves as an upper electrode of a weld nut.

It is preferable that the timing for the support member 11 to release the nut and the like 30 is immediately before the plunger 21 hits on the top of the nut and the like 30. It is also preferable that the inner diameter of the opening of the conductor cylinder 1 where the released nut or the like drops is slightly larger than the outer diameter of the nut and the like; for example, the inner diameter is ⌀14.7 to the nut's outer diameter of ⌀14.5. Both recommendations are for stabilizing the posture of the dropping nut and the like 30.

With the above structure, when the plunger 21 is moved up to put the support bars 11 together with the balls 5 into the conductor cylinder 1 by the elastic repulsion of the leaf springs 12 to enable the nut holding function of the support bars 11, and one nut and the like 30 is fed from the feeder opening 2 continuous to the lower side wall of the conductor cylinder 1, the nut and the like 30 is kept supported horizontally by the support bars 11. When the plunger 21 is moved downward, the two guide grooves 22 formed in the plunger 21 abut on the respective balls 5 to push the balls 5 outward with the lowering of the plunger 21. The support bars 11 retract outward while holding the nut and the like 30 horizontal by the leaf springs 12. The nut and the like 30 finally loosens from the support and makes a free fall, under the guide of the conductor cylinder 1, on a workpiece 41 held by the support member 31. Therefore, the nut and the like 30 can surely be fed to the workpiece 41.

When the plunger 21 is moved up after feeding a single nut and the like 30 to the workpiece in this manner, the support bars 11 together with the balls 5 protrude into the conductor cylinder 1 due to the elastic repulsion of the leaf springs 12, automatically recovering the initial state to cause the support bars il to temporarily support the next nut and the like 30 fed from the feeder opening 2. Thereafter, the same seeps will be repeated.

As apparent from the foregoing description of this embodiment, the traction and retraction of the support bars holding a nut and the like is accomplished without the action of any nut and the like dropped by the plunger, preventing the support bars from wearing out and allowing nuts and the like to always keep the proper posture. Further, there is no chance of nuts and the like to be stuck in the lower opening portion of the conductor cylinder or to be scratched. Furthermore, since the support bars, which support a nut and the like horizontally, retract while keeping the horizontal state, the nut and the like will not tilt during releasing of the temporary support by the support bars. This can ensure accurate feeding of nuts and the like to the proper position and thus significantly reduce the occurrence of defects, improving the product yield.

In short, the present invention overcomes the inherent problem of this type of conventional apparatus for feeding nuts and the like, and has advantages of providing a nut feeding apparatus with a simpler structure at a low cost, thus greatly contributing to the development of the industry in question.

What is claimed is:

1. A feeding apparatus for feeding nuts and the like, comprising:
    a conductor cylinder (1) having a feeder opening (2) provided at a lower side wall of the conductor cylinder (1) and through which nuts and the like are continuously fed from a feeding device,
    support bar guide holes (3) in the conductor cylinder (1) for receiving support bars for temporarily supporting nuts and the like fed into the conductor cylinder (1) from the feeder opening (2),
    ball recesses (4) formed in the conductor cylinder (1) and located above the support bar guide holes (3),
    balls (5) having a diameter larger than the thickness of a wall of the conductor cylinder (1) and fitted in respective ball recesses (4),
    leaf springs (12) attached to an outer surface portion of the conductor cylinder (1),
    a pair of support bars (11) slidably mounted in the support bar guide holes (3) for temporarily and horizontally supporting a single nut and the like fed into the conductor cylinder (1) from the feeder opening (2), each support bar (11) having an outer end portion coupled to an associated one of the leaf springs (12), the leaf springs (12) urging respective support bars (11) inwardly toward an interior of the conductor cylinder (1), and
    a plunger (21) inserted slidably in the conductor cylinder (1) for up and down movement in the conductor cylinder (1), and the plunger (21) having means at a lower portion thereof for engaging the balls (5) to push the engaged balls outward of the conductor cylinder (1) when the plunger is moved downwardly in the conductor cylinder (1) to cause the support bars (11) to release a supported nut and the like for ejecting the released nut and the like from the conductor cylinder.

2. A feeding apparatus according to claim 1, wherein each of the leaf springs (12) comprises a lamination of a plurality of thin spring plates.

3. A feeding apparatus according to claim 1, wherein the plunger (21) has respective guide grooves (22) at a lower portion thereof for engaging respective balls (5).

4. A feeding apparatus according to claim 3, comprising a pair of said ball recesses (4) and respective balls (5) arranged on opposite sides of the conductor cylinder (1); and wherein the plunger (21) has a pair of the guide grooves (22) formed on opposite sides of the lower portion of the plunger (21) for engaging respective balls (5).

5. A feeding apparatus according to claim 4, wherein the balls (5), when moved outwardly during engagement with the plunger (21), resiliently move the leaf springs (12) outwardly of the conductor cylinder (1) for thereby slidably moving the support bars (11) out of engagement with the single nut and the like, to thereby release the single nut and the like and to permit the released single nut and the like to be ejected.

6. A feeding apparatus according to claim 5, wherein the support bars (11) have the outer end portions thereof detachably attached to an associated on the leaf springs (12).

7. A feeding apparatus according to claim 1, wherein the support bars (11) have the outer end portions thereof detachably attached to an associated one of the leaf springs (12).

8. A feeding apparatus according to claim 1, wherein the support bars (11) engage portions of the single nut and the like to support the single nut or the like in the conductor cylinder (1).

9. A feeding apparatus according to claim 1, wherein the balls (5) each have a diameter slightly larger than the thickness of the wall of the conductor cylinder (1).

* * * * *